United States Patent [19]

Kirby

[11] Patent Number: 4,868,847
[45] Date of Patent: Sep. 19, 1989

[54] TELEPHONE INTERCOM DEVICE

[76] Inventor: William A. Kirby, 5 Burlington Street, Apt. 3, Missisauga, Ontario L4T 1B6, Canada

[21] Appl. No.: 245,973

[22] Filed: Sep. 15, 1988

Related U.S. Application Data

[63] Continuation of Ser. No. 3,175, Jan. 14, 1987, abandoned.

[51] Int. Cl.$^4$ .......................... H04Q 5/20; H04M 1/72; H04M 9/00
[52] U.S. Cl. ..................................................... 379/160
[58] Field of Search ............... 379/159, 160, 167, 170, 379/171

[56] References Cited

U.S. PATENT DOCUMENTS

| | | | |
|---|---|---|---|
| 3,665,116 | 5/1972 | Holstrom | 379/167 |
| 4,016,372 | 4/1977 | Hoehn | 379/160 |
| 4,079,212 | 3/1978 | Sasai | 379/159 |
| 4,088,846 | 5/1978 | McEowen | 379/159 |
| 4,100,375 | 7/1978 | Noller | 379/102 |
| 4,196,317 | 4/1980 | Bartelink | 379/159 |
| 4,459,434 | 7/1984 | Benning et al. | 379/160 |
| 4,485,273 | 11/1984 | Bartelink | 379/159 |
| 4,588,861 | 5/1986 | Teich | 379/159 |
| 4,754,476 | 6/1988 | Rasmussen et al. | 379/159 |

FOREIGN PATENT DOCUMENTS 1169597  6/1984 Canada .
0178856 10/1984 Japan .................................... 379/167

*Primary Examiner*—Keith E. George
*Attorney, Agent, or Firm*—Fleit, Jacobson, Cohn, Price, Holman & Stern

[57] ABSTRACT

A telephone intercom device is provided for use in a telephone system. The telephone system includes a plurality of telephones interconnected to one another via first and second pairs of conductors, the first pair of conductors also being coupled to an external telephone line. Each of the telephones includes a hook switch associated therewith that is operable to enable the telephone. The intercom device includes a connector for receiving the conductors of the telephone that extend from the hook switch. A pair of telephone call conductors are provided for connecting at one end to the first pair of conductors. A pair of intercom call conductors are also provided for connecting at one end to the second pair of conductors. A mode selection switch is connected at one end to the connector and is operable between first and second positions to connect the conductors extending from the telephone hook switch to one of the telephone call and intercom call conductors. The mode selection switch is biased to the first position and is actuable to the second position upon energization of a relay. A holding circuit is included and associated with the intercom call conductors to maintain the mode selection switch in the second position once the relay has been energized. The holding circuit is disabled when the hook switch is disabled to allow the mode selection switch to revert to the first position. The holding means is also inoperable until the mode selection switch is actuated to the second position. A signalling circuit which is responsive to an electrical signal generates and indication signal onto the intercom call conductors to operate a signaling device in each of the intercom devices. The signalling circuit is isolated from the telephone call connectors and the mode selection switch to allow the indication signal to be generated while the mode selection switch is in the first position to allow an intercom call to be generated without placing an external telephone call on hold.

6 Claims, 3 Drawing Sheets

TELEPHONE INTERCOM DEVICE

This application is a continuation of application Ser. No. 003,175, filed Jan. 14, 1987 now abandoned.

BACKGROUND OF THE INVENTION

Many domestic households have two or more telephone extensions installed about the house, but have no facility for intercom between the instruments. The intercom devices that have been available hitherto all offer far more sophisticated a performance than is needed, and are accordingly too expensive for home use.

Telephone systems installed in domestic households are usually provided with four wires looped around the house to the various outlet locations. These wires are conventionally termed and referred to in this specification as the M, N, P and Q wires. Only two of these wires, M and N, are connected to the external telephone wires. Normally, the other two P, Q are redundant.

There have been a number of previous proposals to use the two spare wires in a domestic intercom system.

In Bartelink U.S. Pat. No. 4,485,273 an intercom system is shown which uses a manual switch to change from the external to the intercom wires. This arrangement, however, prevents normal use of the telephone if the switch is left in the intercom position. Bartelink proposes to avoid this by providing a relay to connect the handset to the external wires when the handset of the telephone is replaced but this arrangement has the disadvantage that as soon as the handset is picked up in response to the ringing of an external call, the switch reverts to the intercom position, thereby interrupting the incoming call.

It is an object of the present invention to obviate or mitigate the above disadvantages.

SUMMARY OF THE INVENTION

According to the present invention there is provided a telephone intercom device for use with each of the telephones in a telephone system, said system including a plurality of telephones interconnected to one another via first and second pairs of conductors, said first pair of conductors also being connected to an external telephone line, each of said telephones having a first switch associated therewith operable to enable said telephone, said intercom device comprising connection means for connecting to said first switch of a telephone, a pair of telephone call conductors for connecting at one end to said first pair of conductors, a pair of intercom call conductors for connecting at one end to said second pair of conductors, a mode selection switch connected at one end to one of said intercom and telephone call conductors and at the other end to said connection means, said mode selection switch being operable between first and second positions to connect said conductors of said telephone to one of said telephone call and intercom call conductors respectively, biasing means to bias said mode selection switch to said first position, switch operating means actuating said mode selection switch to said second position, holding means associated with said intercom call pair of conductors to maintain said mode selection switch in said second position, said holding means being disabled upon disablement of said telephone by said first switch to permit said mode selection switch to revert to said first position, said holding means being inoperable until said switch operating means actuates said mode selection switch to said second position and a signalling circuit responsive to an electrical signal for generating an indication signal on said pair of intercom call conductors to operate a signalling device in each of said intercom devices connected to said second pair of conductors, said signalling means being isolated from said telephone call conductors and said mode selection switch to allow said indication signal to be generated whilst said telephone call conductors remain connected to the conductors of the telephone thereby allowing an intercom to be generated without placing an external telephone call on hold.

BRIEF DESCRIPTION OF THE DRAWINGS

Embodiments of the invention will now be described by way of example only with reference to the accompanying drawings in which.

DETAILED DESCRIPTION OF THE PREFERRED EMBODIMENTS

Figure 1:
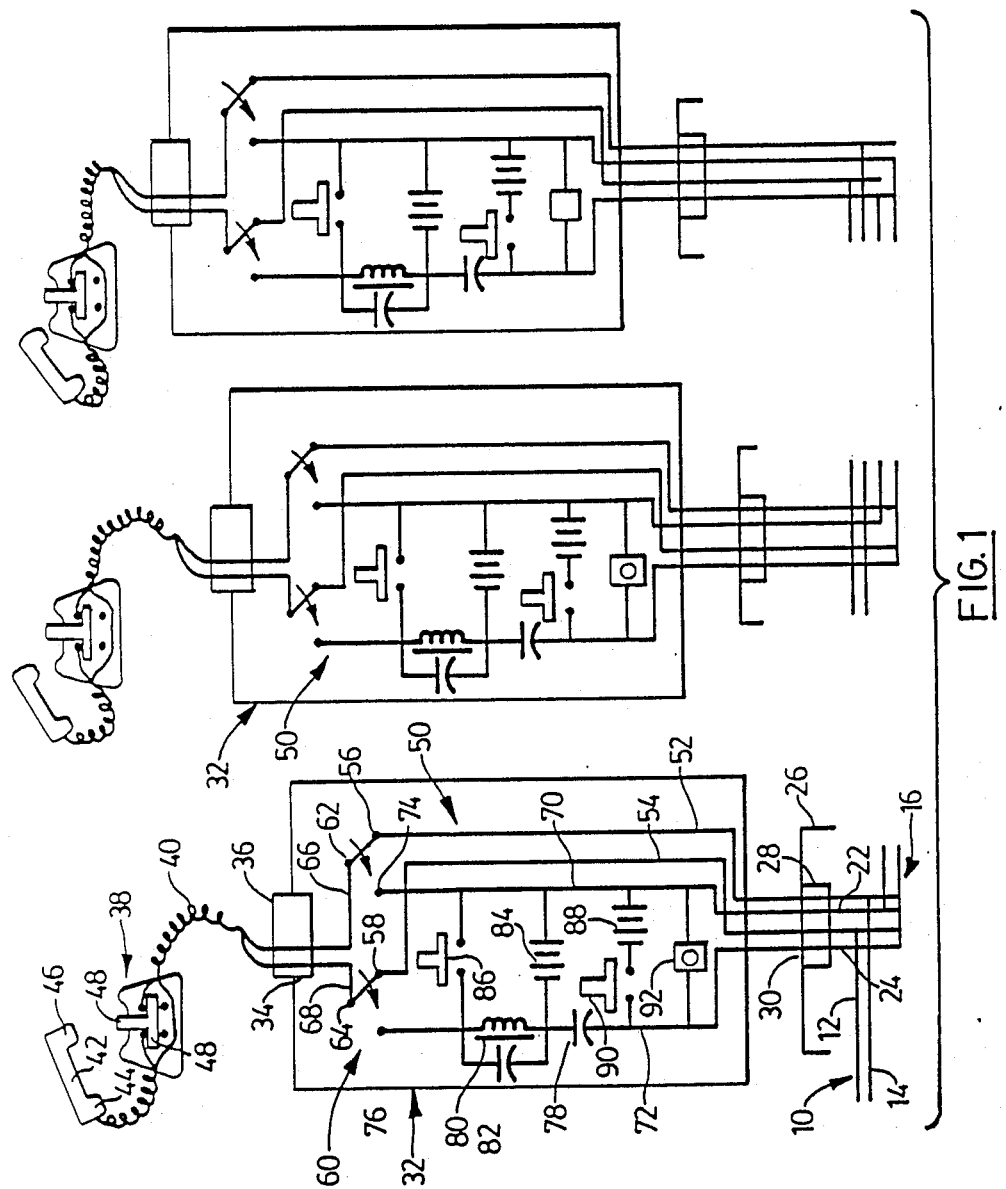
FIG. 1 is a schematic representation of a domestic installation equipped with an intercom device.

Referring, therefore to FIG. 1, an external telephone cable (10) having a pair of conductors (12), (14) normally identified as the M and N conductors, is connected to a two-pair, four-wire cable (16). The cable (16) is formed from a first pair of conductors (18), (20), and a second pair of conductors (22), (24). The cable (16) is looped through the building in which the telephone system is to be installed to terminate at jacks (26) located at convenient locations. Each of the jacks (26) is of conventional structure having a socket (28).

An intercom control circuit box (32) is connected by a plug 30 to each of the jacks at which an intercom facility is required. The box (32) also has a socket (34) of similar configuration to the socket (28) to receive a plug (36) associated with a telephone (38). Each telephone (38) is connected to the box (32) through a two-conductor cable (40) that terminates at the plug (36). As is well known and is shown schematically in FIG. 1, the telephone (38) has a handset (42) containing a mouthpiece (44) and earpiece (46) and engages a cradle switch (48) whenever the handset (42) is replaced on the telephone. The switch (48) therefore controls enabling of the telephone.

Located within the housing (32) between plug (30) and socket (34) is an intercom control circuit generally designated (50). The control circuit (50) includes a pair of conductors (52), (54) that are connected through the jack (26) to the conductors (18), (20) of the cable (16). The conductors (52), (54) terminate at terminals (56), (58) respectively, of a two-pole relay (60) that selects the mode of operation of the control intercom circuit 50. Contacts (62), (64) in the relay (60) are connected to a pair of conductors (66), (68) which terminate at the socket (34) to be connected to the conductors of cable (40). Relay (60) is biased to the position shown in FIG. 1 so that whenever the relay operating circuit is open, the conductors (66), (68) are connected to the external line through the conductors (52), (54).

The circuit (50) includes a second pair of conductors (70), (72) that are connected through a jack (26) to the conductors (22), (24) of cable (16) and extend to a second pair of poles (74), (76) respectively, of the relay (60). Relay (60) is operated by a coil (80) in the conductor (72). A capacitor (78) is incorporated into the conductor (78) prior to the coil (80) and a second capacitor (82) is connected in parallel to the coil (80).

Power for the relay (80) is provided by a battery (84) connected between the conductors (70), (72) and control for the relay is provided by a switch (86) also connected across the conductors (72), (74) in parallel to the relay (60).

A signalling function is provided in the intercom circuit (50) by a power source (88) connected in series with a pushbutton switch (90) which is connected across the conductors (70), (72) on the opposite side of the capacitor (78) to the relay coil (80). A DC buzzer (92) is also connected across the conductors (70, (72) so that a DC voltage applied across those conductors will activate the buzzer.

In operation with the handset (42) at rest on the cradle, the pushbutton (86) is normally open, as is the pushbutton (90). The cradle switch (48) is also open so that the circuit to the relay coil (80) is interrupted and the relay reverts to the position shown in which it connects the conductors (40) to the conductors (58), (56) and thus to the external lines (12), (14). In this position the telephone can be used in the normal manner as lifting the handset (42) from the cradle will not complete a circuit that will energize the coil (80). In this way, external calls can be made or received.

If the intercom feature is to be used the handset is lifted to close the switch (48) and the switch (86) is closed so that the circuit from the battery (84) through the coil (80) is completed. This causes the relay (60) to move to a position in which the contacts (62), (64) make with the conductors (74), (76) to connect the conductors (40) with the conductors (22), (24). When the switch (86) is released, the relay is held in the intercom position by the closed circuit provided by the switch (48). The DC voltage applied by the battery (84) is effective to hold the relay closed until the circuit is once again opened by opening of the cradle switch (48).

In order to signal the other telephones (38) on the circuit, the pushbutton (90) is depressed to complete the circuit from the battery (88) across the conductors (70), (72). This impresses a DC voltage onto the conductors (70), (72) which is also impressed on the corresponding conductors of the other circuits (50). Thus, the buzzer (92) in each of the intercom boxes (32) will sound. To connect the other handsets to the intercom, the respective handset is lifted to close the cradle switch (48) and the pushbutton (86) depressed so that the relay (60) connects the cable (40) to the conductors (22), (24). In this way conversation can be carried out amongst the handsets.

Upon replacement of a handset, the switch (48) is opened which breaks the circuit through the coil (80) and so causes the relay to revert to the position shown in FIG. 1 at which the conductors (40) are connected through conductors (56), (58) to the external conductors (12), (14).

Thus, upon return of the handset (42) to the telephone, or indeed simple depression of the switch (48), the telephone system is returned to a condition in which it can be used in a conventional manner to receive incoming or make outgoing calls.

In the event that an incoming call is received and the call is to be transferred to another handset, the circuit provides for a ring signal to be generated in the other handsets whilst the external call is being received. This is because the capacitor (78) effectively isolates the signalling circuit from the relay operating circuit so that closing of the switch (90) will not operate the relay. Thus, with the handset (42) removed from the cradle to receive an external call, the push button (90) may be depressed to complete the circuit through the buzzer (92) in the other handsets and thereby attract the attention of another party. The provision of the capacitor (78) ensures that the depression of the button (90) will not activate the relay and interrupt the external call.

A number of advantages flow from the apparatus described in FIG. 1. Firstly, the circuit is always reconditioned to receive incoming calls upon completion of the use of the intercom. This is achieved by placing the relay hold circuit in series with the switch (48) with a second switch (86) in parallel. Moreover, as noted above, a signal can be generated on the other handsets even when the normal external call is being received. The signal used is a DC signal as opposed to an AC signal. This results in considerable simplification and at the same time does not interfere with the normal voice communications between adjacent handsets.

Figure 2:
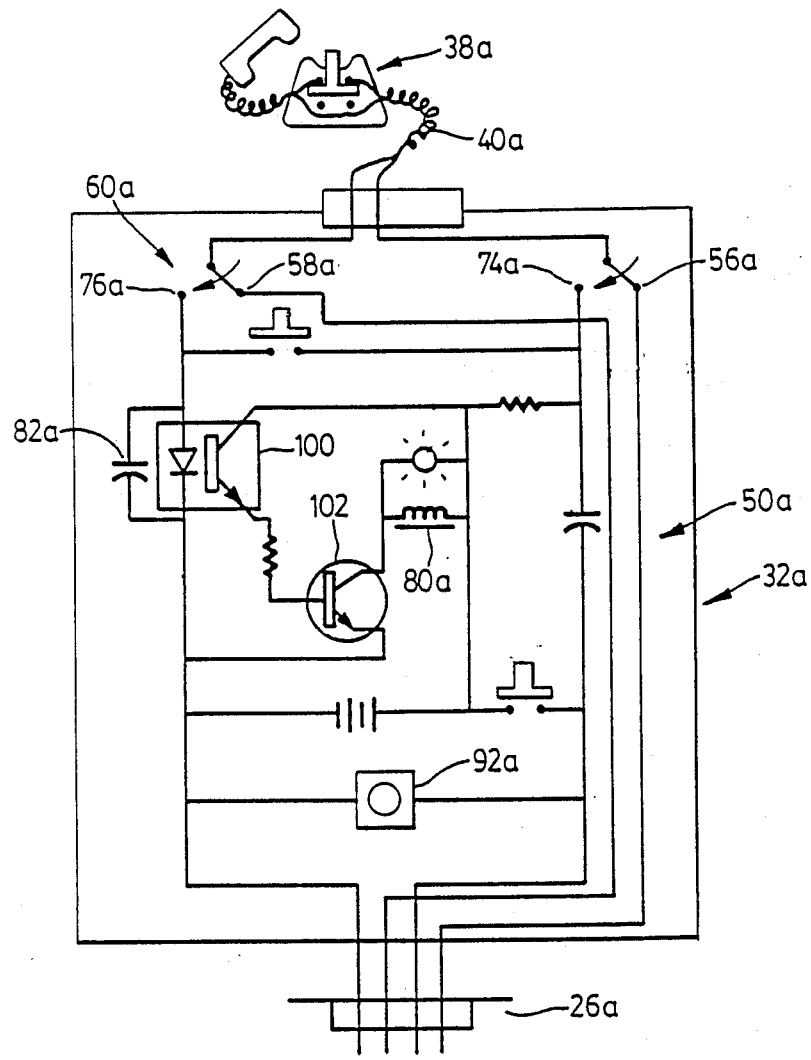
FIG. 2 is an alternative embodiment of the intercom device shown in FIG. 1.

A further embodiment of the circuit shown in FIG. 1 is shown in FIG. 2. In this embodiment, like reference numerals will be used to identify like components with the suffice 'a' added for clarity. In this arrangement an opto-coupler (100) is used to control current flow through the coil (80) to avoid the need to match the impedance of the coil (80) with that of the telephone handset (42). In the arrangement of FIG. 2, when the switch (86) is depressed, current flows from the battery (84) to switch the opto-coupler (100) and turn on a transistor (102). The relay coil (80) is placed in series with the transistor (102) so that upon the transistor being turned on, the relay coil (80) is operated to move the relay to the intercom position. Once the circuit is opened by depression of the switch (84) on the handset, the relay (60a) returns to the position in which the conductors (40a) are connected to the conductors (70), (72).

The capacitor (82a) and a similar capacitor (104) included in the conductor (70a) permit transmission of the voice frequency voltages to pass along the conductors (70), (72) without rectification by the opto-coupler (100). The capacitors (82a) and (104) also isolate the relay operating circuit from the signalling circuit to ensure tht the relay (60a) does not operate when buzzers (92b) are operated. Similarly, to avoid a large current drain when the switch (86a) is depressed, a current-limiting resistor (106) is included in the feed from the conductor (70). It will also be noted that a light (108) is included in parallel with the relay coil (80a) to indicate when the intercom is in use.

Figure 3:
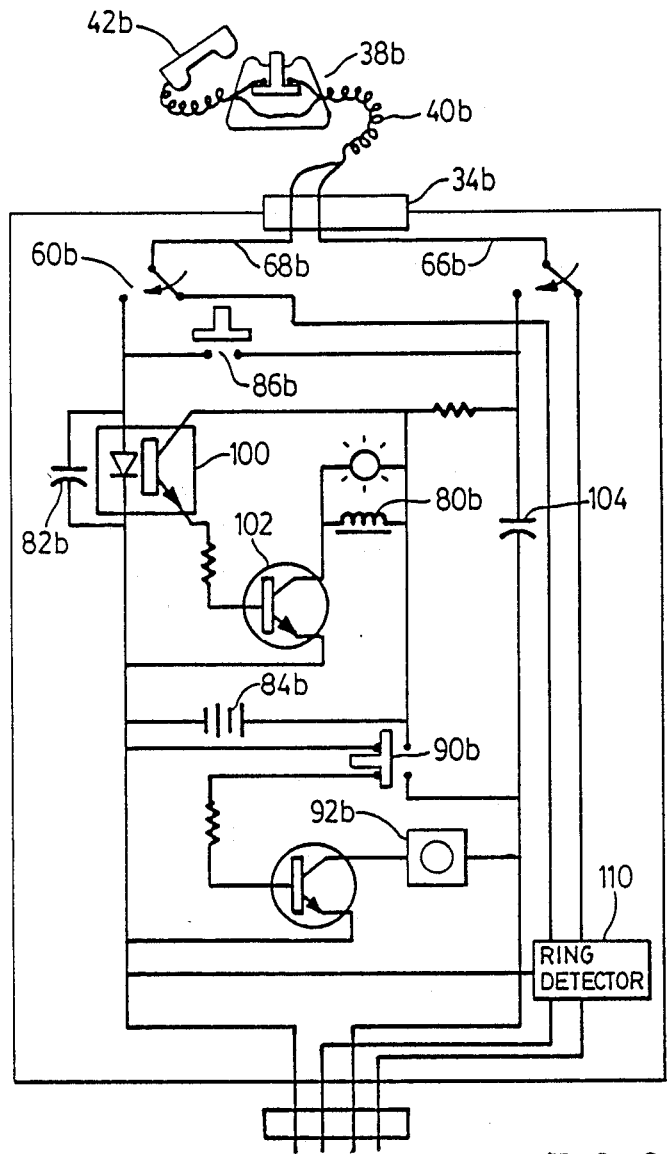
FIG. 3 is yet a further embodiment of the intercom device shown in FIG. 1.

The arrangement shown in FIG. 3 is similar to that of FIG. 2 with like components identified by the same reference numeral as in FIG. 1 but a suffix 'b' added for clarity. In this arrangement, the DC buzzer (92b) is inhibited when the call is initiated from the associated intercom device (32b). In this arrangement, the single pole switch (90) in FIG. 1 is replaced by a double pole switch (90b) that, in its normal position, makes the circuit that includes the buzzer (92b). However, upon movement of the switch to a position to signal on other handsets, the branch of the circuit including the buzzer in the intercom station is isolated, although a DC voltage is still applied across the conductors (70), (72). In the embodiment of FIG. 3 a ring detector (110) is included in the conductors (54), (52) to generate a voice frequency tone in the conductors (70), (72) when a ring tone is received on the lines (52), (54). In this way the user of the handset in the intercom mode will be aware of an incoming call on the external lines (12) and (14).

It will be seen therefore that in each arrangement a very simple yet effective intercom device is provided which has the facility for reverting to the normal telephone use once the handset is replaced on the telephone. Moreover, the application of a simple DC voltage on to actuate the signal at each intercom station obviates the need for complicated frequency detection circuits and will not interfere with voice signal transmission.

What we claim is:

1. A telephone system including at least two telephones, each of said telephones having an intercom device associated therewith, said telephones being interconnected to one another via first and second pairs of conductors, said first pair of conductors also being connected to the external telephone line, each of said telephones having a first switch associated therewith operable to enable said telephone, each of said intercom devices comprising:
   connection means for connecting said intercom device to said first switch of the associated telephone;
   a pair of telephone call conductors for connecting at one end to said first pair of conductors;
   a pair of intercom call conductors for connecting at one end to said second pair of conductors;
   a mode selection switch connected at one end to one of said intercom and telephone call conductors and at the other end to said connection means, said mode selection switch being operable between first and second positions to connect said first switch to one of said telephone call and intercom call conductors respectively;
   biasing means to bias said mode selection switch to said first position;
   switch operating means for actuating said mode selection switch to said second position;
   holding means associated with said pair of intercom call conductors to maintain said mode selection switch in said second position, said holding means being disabled upon disablement of the associated telephone by said first switch to permit said mode selection switch to revert to said first position, said holding means being inoperable until said switch operating means actuates said mode selection switch to said second position; and
   a signalling circuit responsive to an electrical signal for generating an indication signal on said pair of intercom call conductors to operate a signalling device in each of said intercom devices connected to said second pair of conductors, said signalling circuit being isolated from said telephone call conductors and said mode selection switch to allow said indication signal to be generated whilst said telephone call conductors remain connected to said first switch thereby allowing an intercom call to be generated without placing an external telephone call on hold.

2. The telephone system according to claim 1 wherein in each of said intercom devies said mode selection switch and said biasing means are formed from an electrically operated relay and a relay actuated switch and said switch operating means includes a second switch operable to connect said relay to a first power supply, said relay actuating said relay actuated switch upon connection to said first power supply.

3. The telephone system according to claim 2 wherein in each of said intercom devies said signalling circuit is electrically isolated from said first power supply to prevent said indication signal from being generated upon connection of said relay to said first power supply.

4. The telephone system according to claim 3 wherein each said signalling circuit includes a second power supply for supplying said electrical signal and a third switch for connecting said second power supply to said intercom call conductors thereby generating said indication signal.

5. The telephone system according to claim 4 wherein each second power supply is a dc power source and wherein each signalling device is a dc operated buzzer.

6. The telephone system according to claim 3 wherein in each of said intercom devies said switch operating means is connected across said intercom call conductors and said holding means is constituted by a closed circuit including said first power supply, said relay, said relay actuated switch and said associated telephone when said first switch therein is operable to enable said associated telephone.

* * * * *